Patented Sept. 20, 1927.

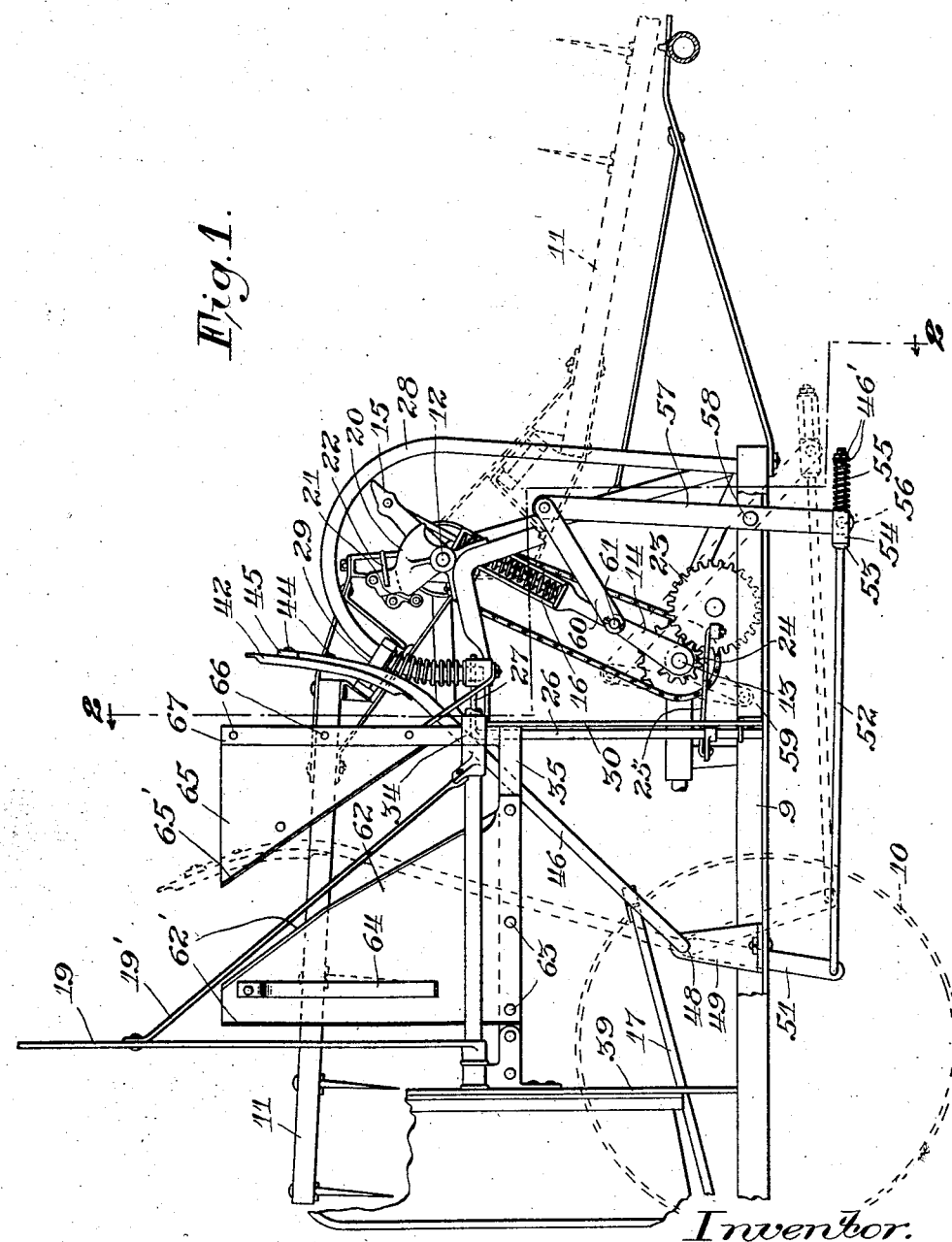

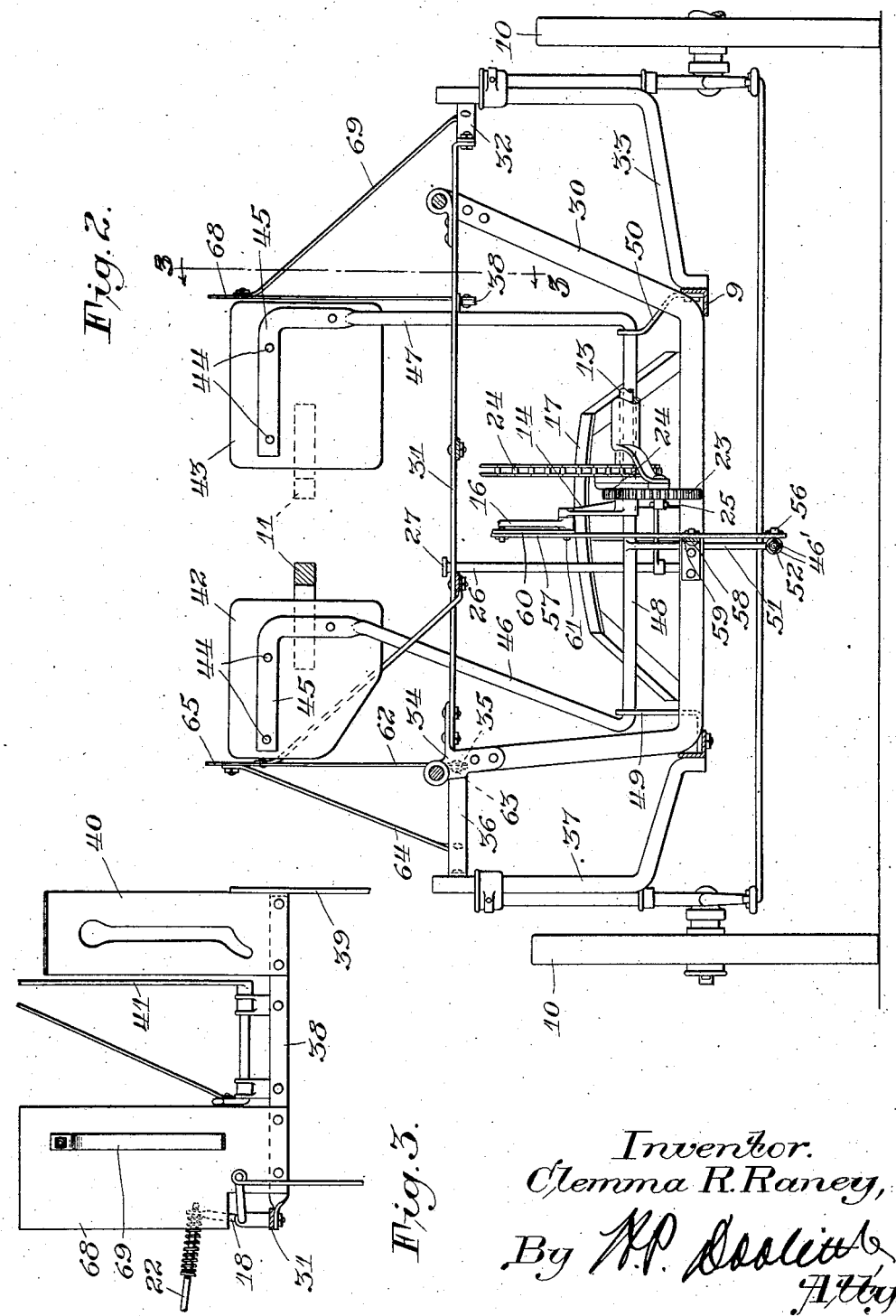

1,643,173

UNITED STATES PATENT OFFICE.

CLEMMA R. RANEY, OF CHICAGO, ILLINOIS, ASSIGNOR TO INTERNATIONAL HARVESTER COMPANY, A CORPORATION OF NEW JERSEY.

GRAIN SHOCKER.

Application filed November 29, 1920. Serial No. 427,006.

My invention relates to shocking machines.

Under certain conditions it has been found an advantage, in fact advisable in most conditions in setting up stable shocks to have the upper or top sheaves of the shock extend beyond the plane of the base of the shock.

My invention has for its object to position the sheaves in the shocker receptacle in an improved manner.

A further object is to provide a construction by means of which certain of the sheaves are shifted with respect to the other sheaves in the receptacle.

A further object is to provide a mechanism which will shift the sheaves in the receptacle in proportion to their length.

A further object is to produce a shock with the upper sheaves extending beyond the plane of the base of the shock in a manner to set a firm shock in the field.

I attain these and other objects by providing an improved sheaf positioning means cooperating with the sheaf delivery member of the shocker, whereby the upper or top sheaves are moved rearwardly with respect to the remaining sheaves in the receptacle in such a manner that all the sheaves occupy a position in the receptacle conducive to the building of a compact shock capable of standing in the field under all weather conditions.

In the accompanying drawings I have illustrated one embodiment which my invention may assume in practice. It is to be understood, however, that the form shown herein, may be modified.

Fig. 1 is a side elevational view of the shocker equipped with my improved device.

Fig. 2 is a front elevational view of the same taken along line 2—2 of Fig. 1, and Fig. 3 is a detail view taken on the knotter side of the shocker along line 3—3 of Fig. 2.

In the construction, I have illustrated a shocker of the standard type, comprising a main frame 9 mounted on carrying wheels 10, having a sheaf delivery member or fork 11 pivotally mounted thereon at 12 and operated through a power shaft 13 from any suitable source of power, the rotation of this power shaft 13 being transmitted to the sheaf delivery member 11 through the cranks 14 and 15 and a resilient pitman connection 16 in such a manner that, as the shaft 12 is rotated the member 11 is moved alternately back and forth from the dotted line position to full line position shown in Fig. 1, to receive and deliver the sheaves to a shocker receptacle 17. As in the standard construction (see applicant's prior Patent No. 1,231,195 of June 26, 1917), suitable tripping mechanism 18 is provided to control the connection of the shocker binding needle 19 to the power shaft 13.

A cam 20 is fixed to a bracket carried by the frame and a member 21 is keyed to and rocks with the shaft 12 adjacent the cam where it may cooperate with the cam to control a clutch, through the mechanism 22 and 18, for driving the needle. For a detailed description of this mechanism see my prior Patent No. 1,231,195 issued June 26, 1917. Also as is provided in the standard construction, the two-to-one gearing 23 and 24 is driven from the power shaft 13 and connected through a link 25 to a vertically disposed shaft 26 which has a horizontally disposed crank 27 formed integrally therewith for oscillating the bail 28 which laterally deflects the fork 11 by means of the guide rollers 29 positioned on the opposite sides of the bail. The fork 11, in the course of delivering sheaves to the receptacle is deflected alternately from the full line position to the dotted line position shown in Fig. 2, and in the manner described and claimed in my U. S. Letters Patent #1,242,112 October 2, 1917.

The shock supporting frame comprises the usual U frame member 30 fixed to the main frame 9 and in turn supports a transversely disposed bar 31. The grassward end of the bar 31 is fixed to a brace 32, which supports a channel bracket 33 on which the carrying wheel is mounted. The stubbleward end of the bar 31 is connected through a bearing bracket 34 to a rearwardly extending side frame member 35, to which is attached a brace 36 for supporting the channel bracket 37 for the shocker carrying wheel. An additional rearwardly extending side frame member 38 is provided and is connected at its forward end to the cross bar 31 and at its rear end to the vertical frame member 39. The frame member 38 supports a knotter breast plate 40 and compressor arm 41.

My improved device for moving longitudinally or rearwardly the top sheaves of each stock comprises a pair of oscillating sheaf shifting members 42 and 43 disposed on the opposite sides of the shocker receptacle, preferably made of sheet steel, fixed by means of rivets 44 to the flattened and laterally curved ends 45 of the substantially vertically disposed shafts 46 and 47. The shafts 46 and 47 have a horizontally disposed portion 48, pivotally mounted in the bearing brackets 49 and 50 fixed to the main frame 9. Formed integrally with the horizontal portion 48 or fastened thereto in any well known manner is a depending crank 51 which has pivotally connected at its free end a connecting rod 52. The rod 52 is provided with a raised portion 53 adapted to form a stop for a swiveling member 54 which is free to slide on the rod but is normally held against the stop 53 by a compression spring 55 held in position by a washer and nut 46'. By this construction a resilient pitman is formed between the power actuating means and the oscillating members.

The swiveling member 54 has a laterally projecting stud 56 which is pivotally connected to the lower end of a lever 57. The lever 57 is pivoted at 58 to a rearwardly extending member 59 fixed to the main frame 9. Pivotally connected to the upper end of the lever 57 is a connecting link 60, the rear end of which is connected to a stud 61 which forms the pivot for the pitman 16 and crank 14.

From the above description it will be noted that as the fork delivery member 11 is oscillated back and forth in the normal operation of delivering sheaves from the harvester to the receptacle of the shocker, that the power is derived from the shaft 13, and through the crank 14 the lever 57 will be swung counter-clockwise (from full line position to dotted line position) and thus through the pitman 52 and crank 51, the sheaf shifting members 42 and 43 assume the dotted line position shown in Fig. 1, shifting the top sheaves rearwardly in a manner to complete a compact shock capable of standing in the field.

From this construction it will here be noted that the top sheaves of the shock or those which are engaged by the sheaf shifting members 42 and 43 in their normal operation are shifted rearwardly in accordance with their length; that is, when the grain or the sheaves which form the upper part of the shock are long the heads of these sheaves extend forwardly in the receptacle. These forwardly extending sheaves are engaged by the sheaf shifting members and are shifted rearwardly by these members accordingly. In other words, when the sheaves are relatively long their heads extend forwardly in the receptacle and by reason of this they are shifted rearwardly substantially the entire movement of the sheaf shifting members 42 and 43; that is, from full line position to dotted line position shown in Fig. 1, and when these sheaves are relatively short, they occupy a position to the rear of the receptacle in which their heads are out of reach of the sheaf shifting members 42 and 43, and are therefore not shifted by these members. It is therefore understood that the distance the sheaves are shifted by the sheaf shifting member is determined or controlled by the length of the grain.

Additional means are provided for assisting the sheaf shifting members 42 and 43 in a manner to confine the heads of top sheaves in the path of movement of the shifting members. This means comprises a plurality of shields positioned on the opposite sides of the receptacle. A trapezoidal shaped shield 62 is disposed in a vertical position with its end secured by means of bolts 63 to the rearwardly extending frame member 35 and braced at its upper end by the diagonally disposed brace 64 fixed to the brace member 36. Forward of the shield 62 is a triangular shield 65 fastened by means of bolts 66 to a vertical extending bar 67 fixed to the side frame member 35. The shields 62 and 65 are reinforced and strengthened by having their edges 62' and 65' respectively bent at right angles. The arrangement of these shields allows a diagonal opening between the shields 62 and 65 and permits the needle brace 19' to pass therethrough in the normal operation of binding the shock.

The grassward side of the shocker is provided with a vertically disposed rectangular shield 68 secured at its lower end to the frame member 38 and at its upper end by a diagonal brace 69. From the above construction it will be noted that the heads of the top sheaves will be confined within the shields 62, 65 and 68 so as to be in the path of movement of the sheaf shifting mechanism when the same is actuated to move the top sheaves of each shock rearwardly.

In the operation of the above described device it will be noted that the sheaf shifting mechanism cooperates with and is controlled by the sheaf delivery member in such a manner that as the sheaf delivery member 11 is returned to normal sheaf receiving position, the sheaf shifting mechanism is oscillated rearwardly and as the sheaf delivery member is actuated to deliver a sheaf into the receptable 17, the sheaf shifting mechanism is oscillated forwardly. This operation is continued until the number of sheaves in the receptacle has reached a height sufficient to be within the path of movement of the sheaf shifting members 42 and 43, at which time and upon the return of the sheaf delivery member 11, these members 42 and 43 engage the heads of the upper sheaves of the shock and shift the same rearwardly. When the top sheaves have been shifted rearwardly so that their butt ends extend rearwardly beyond the butt ends of the remaining sheaves, the needle 19 is actuated by the usual mechanism, not shown and the shock is bound in a manner to withstand the impact when the shock is set up.

While I have in this application specifically described but one form my invention may assume, it is, of course to be understood, that the form chosen for the purpose of illustration may be modified without departing from the spirit of my invention.

What I claim as my invention and desire to secure by Letters Patent is:

1. In a shocking machine, a receptacle, a sheaf delivery member for delivering sheaves to said receptacle and means for bodily shifting the sheaves longitudinally in said receptacle.

2. In a shocking machine, a receptacle, a sheaf delivery member for delivering sheaves to said receptacle, and means co-operating with said sheaf delivery member for bodily shifting the sheaves in said receptacle.

3. In a shocking machine, a receptacle, a sheaf delivery member for delivering sheaves to said receptacle, and oscillating means for shifting the sheaves in said receptacle.

4. In a shocking machine, a receptacle, a sheaf delivery member for delivering sheaves to said receptacle, and means controlled by said sheaf delivery member for shifting the sheaves in said receptacle.

5. In a shocking machine, a receptacle, a sheaf delivery member for delivering sheaves to said receptacle, and means rearwardly movable with respect to said shocking machine for shifting the sheaves in said receptacle.

6. In a shocker, a receptacle, a sheaf delivery member for delivering sheaves to said receptacle, and means for shifting certain of said sheaves longitudinally with respect to other of said sheaves in said receptacle.

7. In a shocker, a receptacle, a sheaf delivery member for delivering sheaves to said receptacle, and means for shifting certain of said sheaves rearwardly with respect to other of said sheaves in said receptacle.

8. In a shocker, a receptacle, a sheaf delivery member for delivering sheaves to said receptacle, and oscillating means for shifting certain of said sheaves longitudinally with respect to other of said sheaves in said receptacle.

9. In a shocker, a receptacle, a sheaf delivery member for delivering sheaves to said receptacle, and oscillating means for shifting certain of said sheaves rearwardly with respect to other of said sheaves in said receptacle.

10. In a shocking machine, a receptacle, a sheaf delivery member for delivering sheaves to said receptacle, and means engaging the heads of said sheaves for shifting the sheaves bodily in said receptacle.

11. In a shocking machine, a receptacle, a sheaf delivery member for delivering sheaves to said receptacle, and means engaging the heads of the upper sheaves for shifting the sheaves in said receptacle.

12. In a shocking machine, a receptacle, a sheaf delivery member for delivering sheaves to said receptacle, and means disposed at the opposite sides of said receptacle for bodily shifting and positioning the sheaves longitudinally with respect to each other.

13. In a shocking machine, a receptacle, a sheaf delivery member for delivering sheaves to said receptacle, and means disposed at the opposite sides of said receptacle for bodily shifting the sheaves rearwardly in said receptacle.

14. In a shocking machine, a receptacle, a sheaf delivery member for delivering sheaves to said receptacle, a sheaf shifting mechanism mounted for movement on said machine for bodily and longitudinally shifting the sheaves in said receptacle, and means for confining the heads of the sheaves in the path of movement of said mechanism.

15. In a shocking machine, a receptacle, a sheaf delivery member for delivering sheaves to said receptacle, a sheaf shifting mechanism mounted for movement on said machine, for bodily and longitudinally shifting the sheaves in said receptacle and means disposed on the opposite sides of said receptacle for confining the heads of the sheaves in the path of movement of said mechanism.

16. In a shocking machine, a receptacle, a sheaf delivery member for delivering sheaves to said receptacle, a sheaf shifting mechanism mounted for movement on said machine, and vertical shields disposed on the opposite sides of said receptacle for confining the heads of the sheaves in the path of movement of said mechanism.

17. In a shocking machine, a receptacle, a sheaf delivery member for delivering sheaves to said receptacle, an oscillating sheaf shifting mechanism mounted forward of said receptacle for shifting sheaves rearwardly in said receptacle, and means disposed on the opposite sides of said receptacle for confining the heads of said sheaves in the path of movement of said mechanism.

18. In a shocking machine, a receptacle, a sheaf delivery member for delivering sheaves to said receptacle, and a sheaf shifting mechanism pivotally mounted on said machine rearwardly of said sheaf delivery member in its normal sheaf receiving position and forwardly of said receptacle.

19. In a shocking machine, a receptacle, a sheaf delivery member for delivering sheaves to said receptacle, and means for shifting the sheaves in said receptacle operable on the opposite sides of the path of movement of said sheaf delivery member and longitudinally of said receptacle.

20. In a shocker, a receptacle, a sheaf delivery member for delivering sheaves to said receptacle, and means comprising two substantially vertically disposed members and movable in a rearwardly direction for bodily shifting the sheaves in said receptacle.

21. In a shocker, a receptacle, a sheaf delivery member for delivering sheaves to said receptacle, and means comprising two substantially vertically disposed members operable in a plane substantially parallel to the path of movement of said sheaf delivery member for shifting the sheaves in said receptacle.

22. In a shocker, a receptacle, a sheaf delivery member for delivering sheaves to said receptacle, and a sheaf shifting mechanism mounted for oscillating movement on the opposite sides of the path of movement of and movable in a plane substantially parallel to the plane of movement of said sheaf delivery member for shifting the sheaves in said receptacle.

23. In a shocker, a receptacle, a sheaf delivery member for delivering sheaves to said receptacle, and a sheaf shifting mechanism mounted for oscillating movement on the opposite sides of the path of movement of said sheaf delivery member for shifting certain of the sheaves longitudinally with respect to other of said sheaves in said receptacle.

24. In a shocking machine, a receptacle, a sheaf delivery member for delivering sheaves to said receptacle, a binding mechanism for binding the sheaves in said receptacle, and means for shifting the sheaves in said receptacle prior to binding said sheaves.

25. In a shocking machine, a receptacle, a sheaf delivery member for delivering sheaves to said receptacle, a binding mechanism for binding the sheaves in said receptacle, and means for shifting certain of said sheaves in said receptacle prior to binding said sheaves.

26. In a shocking machine, a receptacle, a sheaf delivery member for delivering sheaves to said receptacle, a binding mechanism for binding the sheaves in said receptacle, and means for shifting certain of said sheaves rearwardly in said receptacle prior to binding said sheaves.

27. In a shocking machine, a receptacle, a sheaf delivery member for alternately delivering sheaves on the opposite sides of said receptacle, a binding mechanism for binding the sheaves in said receptacle, and means disposed on the opposite sides of the path of movement of said sheaf delivery member for positioning the sheaves prior to binding same.

28. In a shocking machine, a sheaf receiving receptacle, mechanism for positioning the sheaves prostrate upon the opposite sides of said receptacle, and means for bodily shifting the sheaves longitudinally in said receptacle.

29. In a shocking machine, a sheaf receiving receptacle, mechanism for positively positioning the sheaves prostrate upon the opposite sides of said receptacle, with the butts of said sheaves substantially in a single plane, and means for bodily shifting the butts of certain of said sheaves out of said plane.

30. In a shocking machine, a sheaf receiving receptacle, a sheaf delivery member for alternately depositing sheaves on the opposite sides of said receptacle with the butts of said sheaves positioned in substantially a single plane, and means for simultaneously shifting the butts of certain sheaves on both sides of said receptacle.

31. In a shocking machine, a sheaf receiving receptacle, a sheaf delivery member for alternately delivering sheaves on the opposite sides of said receptacle, and means for shifting certain of said sheaves longitudinally on both sides of said receptacle simultaneously with respect to other of said sheaves in said receptacle.

32. In a shocking machine, having a receptacle, a sheaf delivery member for alternately depositing sheaves on the opposite sides of said receptacle, and means for shifting said sheaves longitudinally in said receptacle.

33. In a shocking machine, having a receptacle a sheaf delivery member for alternately depositing sheaves on the opposite sides of said receptacle, and means for shifting said sheaves rearwardly in said receptacle.

34. In a shocking machine, a receptacle, a sheaf delivery member for alternating depositing sheaves on the opposite sides of said receptacle, a binding mechanism for binding said sheaves in said receptacle, and means for shifting certain of said sheaves rearwardly prior to binding said sheaves in said receptacle.

35. In a shocker, a receptacle, a sheaf delivery member for delivering sheaves to said receptacle and means for positioning the sheaves in said receptacle controlled by the length of said sheaves.

36. In a shocker, a receptacle, a sheaf delivery member for delivering sheaves to said receptacle and means for positioning certain of the sheaves in said receptacle controlled by the length of said sheaves.

37. In a shocker, a receptacle, a sheaf delivery member for delivering sheaves to said receptacle and means for varying the position of the sheaves in said receptacle in accordance with the length of said sheaves by bodily shifting the same.

38. In a shocker, a receptacle, a sheaf delivery member for delivering sheaves to said receptacle and means for shifting the sheaves rearwardly in said receptacle controlled by the length of said sheaves.

39. In a shocking machine, a sheaf receiving receptacle, mechanism for positioning the sheaves prostrate upon the opposite sides of said receptacle, and means for varying the position of the sheaves in said receptacle in accordance with the length of said sheaves.

40. In a shocker, a receptacle, a sheaf delivery member for delivering sheaves to said receptacle, and means for shifting the sheaves in said receptacle whereby the length of the sheaves controls the amount of shifting of said sheaves.

41. In a shocker, a receptacle, a sheaf delivery member for delivering sheaves to said receptacle, and means, for shifting the sheaves in said receptacle operating on the opposite sides of the path of movement of said sheaf delivery member, said means being actuated to shift said sheaves in accordance with their length.

42. In a shocking machine, a receptacle, a sheaf delivery member for delivering sheaves to said receptacle, a binding mechanism for binding the sheaves in said receptacle, and means for shifting certain of said sheaves rearwardly in said receptacle prior to binding said sheaves, said means being actuated to shift said sheaves in accordance with their length.

43. In a shocking machine, a receptacle, a sheaf delivery member for delivering sheaves to said receptacle, a binding mechanism for binding the sheaves in said receptacle, and means for shifting the sheaves in said receptacle prior to binding said sheaves, said means being actuated to shift said sheaves in accordance with their length.

44. In a shocking machine having a receptacle, a sheaf delivery member for alternately depositing sheaves on the opposite sides of said receptacle, and means for shifting said sheaves in said receptacle, said means being actuated to shift said sheaves in accordance with their length.

45. In a shocking machine, having a receptacle, a sheaf delivery member for alternately depositing sheaves on the opposite sides of said receptacle, and means for shifting said sheaves rearwardly in said receptacle, said means being actuated to shift said sheaves in accordance with their length.

In testimony whereof I affix my signature.

CLEMMA R. RANEY.

CERTIFICATE OF CORRECTION.

Patent No. 1,643,173.  Granted September 20, 1927, to

CLEMMA R. RANEY.

It is hereby certified that error appears in the printed specification of the above numbered patent requiring correction as follows: Page 3, lines 21 and 10 claims 1, and 15, page 4, lines 107 and 122, claims 33 and 35, line 127, claim 36, page 5, line 2, claim 37, and line 8, claim 38, after the word "receptacle" insert a comma; page 3, line 105, claim 15, after the word "machine" strike ot the comma; page 3, line 114, claim 16, after the word "machine" insert the wo "for bodily and longitudinally shifting the sheaves in said receptacle"; page 4, line 101, claim 32, line 106, claim 33, and page 5, line 56, claim 45, after th word "machine" strike out the comma; page 5, line 26, claim 41, after the word "means" strike out the comma; and that the said Letters Patent should be read with these corrections therein that the same may conform to the record of the case in the Patent Office.

Signed and sealed this 24th day of January, A. D. 1928.

Seal.

M. J. Moore,
Acting Commissioner of Patents.